US012038971B2

(12) United States Patent
Avnor et al.

(10) Patent No.: US 12,038,971 B2
(45) Date of Patent: Jul. 16, 2024

(54) SYSTEMS METHODS AND COMPUTER STORAGE MEDIA FOR COLLECTING AND PROCESSING PROGRESSIVISTIC METADATA

(71) Applicant: FANTASTIC ATHLETES CORPORATION, Tallahassee, FL (US)

(72) Inventors: Efrat Avnor, Hod Hasharon (IL); Sami Sabri, Hod Hasharon (IL)

(73) Assignee: FANTASTIC ATHLETES CORPORATION, Tallahassee, FL (US)

( * ) Notice: Subject to any disclaimer, the term of this patent is extended or adjusted under 35 U.S.C. 154(b) by 149 days.

(21) Appl. No.: 17/888,754

(22) Filed: Aug. 16, 2022

(65) Prior Publication Data

US 2022/0391443 A1   Dec. 8, 2022

Related U.S. Application Data

(63) Continuation-in-part of application No. 17/385,458, filed on Jul. 26, 2021, now Pat. No. 11,429,666, which is a continuation of application No. 16/726,876, filed on Dec. 25, 2019, now Pat. No. 11,113,332.

(30) Foreign Application Priority Data

Mar. 31, 2019   (GB) ..................... 1904514

(51) Int. Cl.
*G06F 16/78* (2019.01)
*G11B 27/031* (2006.01)
*G11B 27/28* (2006.01)
*H04N 21/84* (2011.01)

(52) U.S. Cl.
CPC ............ *G06F 16/78* (2019.01); *G11B 27/031* (2013.01); *G11B 27/28* (2013.01); *H04N 21/84* (2013.01)

(58) Field of Classification Search
CPC ....... G06F 16/78; G11B 27/031; G11B 27/28; H04N 21/84
See application file for complete search history.

(56) References Cited

U.S. PATENT DOCUMENTS

| | | | | |
|---|---|---|---|---|
| 2013/0124461 | A1* | 5/2013 | Dombrowski | G06F 16/48 707/610 |
| 2018/0132011 | A1* | 5/2018 | Shichman | H04N 21/235 |
| 2018/0255332 | A1* | 9/2018 | Heusser | H04H 20/18 |

OTHER PUBLICATIONS

Christian Frodl Commercialization of Sports Data: Rights of Event Owners Over Information and Statistics Generated About Their Sports Events Marquette Sports Law Review, vol. 26, Issue 1, Fall 2015.

* cited by examiner

*Primary Examiner* — Mishawn N. Hunter
(74) *Attorney, Agent, or Firm* — Mark Cohen; Pearl Cohen; ZEDEK LATZER BARATZ LLP

(57) ABSTRACT

Systems, methods and computer readable storage media for collecting and processing progressivistic metadata are described; a structure of files comprising a progressivistic metadata and implementational aspects of various uses thereof are further described.

20 Claims, 7 Drawing Sheets

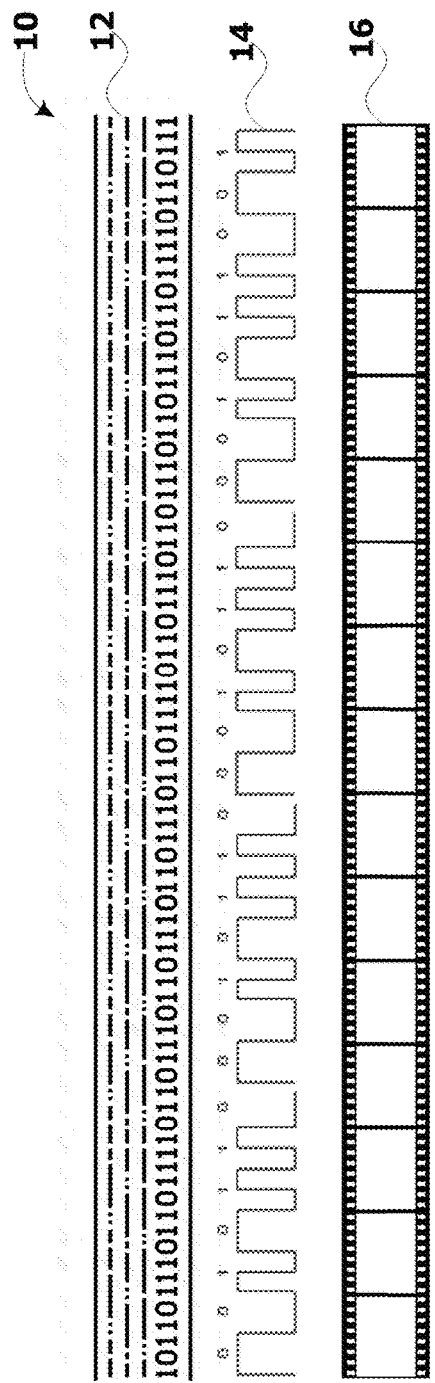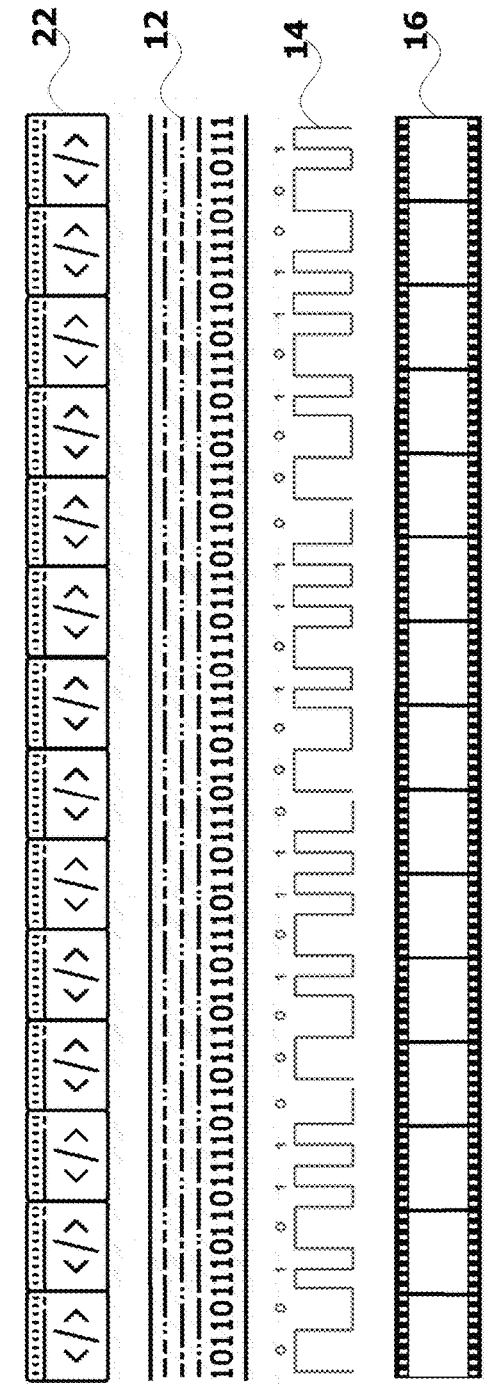
Fig. 1
PRIOR ART
Fig. 2
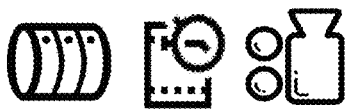

SYSTEMS METHODS AND COMPUTER STORAGE MEDIA FOR COLLECTING AND PROCESSING PROGRESSIVISTIC METADATA

CROSS-REFERENCE TO RELATED APPLICATIONS

The present application is a continuation-in-part of U.S. patent application Ser. No. 17/385,458 filed 26 Jul. 2021, which is a continuation of U.S. patent application Ser. No. 16/726,876 filed 25 Dec. 2019, which claims the benefit of Paris convention priority to and from GB patent application Ser. No. 1904514.5 filed on 31 Mar. 2019, the content of which is hereby incorporated herein in its entirety by this reference.

TECHNICAL FIELD

In general, the present invention pertains to the art of computer science. In particular, the invention relates to systems, methods and computer readable storage media for collecting and processing progressivistic metadata.

BACKGROUND ART

State of the art sports analytics refers to collection of relevant, historical, statistics that when properly applied can provide a competitive advantage to a team or individual. Through the collection and analyzation of data, sports analytics provides information to players, coaches and other staff in order to facilitate decision making both during and prior to sporting events. The term "sports analytics" was popularized in mainstream culture following the release of the Moneyball 2011 film, depicting the use of sports analytics to build a competitive team on a minimal budget.

Two key aspects of sports analytics are on-field and off-field analytics. On-field analytics deals with improving the on-field performance of teams and players and is concerned with such aspects as game tactics and player fitness, whereas off-field analytics typically deals with business-related aspects of sports, such increasing ticket and merchandise sales, improving fan engagement, etc.

As technology has advanced over the last years, data collection has become more in-depth and can be conducted with relative ease by automated means, inter alia by employing automated artificial intelligence systems. Eigil Hakedal Skjæveland Master's Thesis on Identifying Higher-Level Semantics in Football Event Data, from the Department of Informatics at the University of Oslo, dated 31 Jul. 2017, explores the extracting of higher-level events from the event data commercially available software Opta™ and characteristics of mapping the XML data to databases and querying it. The content of the Eigil Hakedal Skjæveland Master's Thesis on Identifying Higher-Level Semantics in Football Event Data is hereby incorporated herein in its entirety by this reference.

SUMMARY OF THE INVENTION

The following summary of the invention is provided to exhibit the basic understanding of some principles, underlying various aspects and features of the invention. This summary is not an extensive overview of the invention and as such it is not necessarily intended to particularly identify all key or critical elements of the invention and is not to delineate the scope of the invention. Its sole purpose is to present some concepts of the invention in a simplified form as a prelude to the following more detailed.

The invention was made in view of the deficiencies of the prior art and provides systems, methods and processes for overcoming these deficiencies. According to some embodiments and aspects of the present invention, there is provided a system for collecting and processing progressivistic metadata includes: a timecode database, configured for storing an absolute timecode file, uniquely identifying particular time-frames in a real-life event and/or distinct time-segments in the real-life event; an accessible video files database, configured for storing at least one source video file, in which the video file including a recording of the real-life event, in which the video file further includes a relative timecode file; in which the particular time-frames and/or distinct time-segments in the real-life event in the absolute timecode file in the timecode database are respectively related to particular frames and/or distinct segments in the relative timecode file of the at least one source video file in the video files database; a server configured for generating a progressivistic metadata file, in which events encoded into the progressivistic metadata file are respectively related to the particular time-frames and/or distinct time-segments in the absolute timecode file, in the absolute timecode file database; a progressivistic metadata database, configured for storing the progressivistic metadata file.

In some embodiments the system for collecting and processing progressivistic metadata further includes a performance data module, configured for collecting and processing performance data, in which events logged into a performance data file are related to events encoded into the progressivistic metadata file.

In some embodiments the system for collecting and processing progressivistic metadata further includes at least one progressivistic metadata interface, configured for encoding events into the progressivistic metadata file.

In some embodiments the system for collecting and processing progressivistic metadata further includes at least one progressivistic metadata logging interface, configured for encoding events into the progressivistic metadata file, selected from: a computer terminal including a human-machine interface, configured for manually logging events into the progressivistic metadata file, by a human operator; an interface configured for logging relations between the events encoded into the progressivistic metadata file and the events encoded into the performance data file; an interface configured for specifying an associative metric.

In some embodiments the system for collecting and processing progressivistic metadata further includes a controllable playback device, in which encoding events into the progressivistic metadata file is performed by a human operator in a real-time regime or near real-time regime.

In some embodiments the system for collecting and processing progressivistic metadata further includes at least one automated progressivistic metadata logging module, including a reinforced machine learning device, configured for analyzing the at least one source video file and identifying progressivistic metadata events in the at least one source video file in automated manner and for encoding identified progressivistic metadata events into the progressivistic metadata file.

In some embodiments the system for collecting and processing progressivistic metadata further includes at least one automated progressivistic metadata quality assurance module, including: a plurality of portable computing devices including a human-machine interface, configured for manually logging, by a plurality of watchers of the real-life event, in a real-time regime, preliminary progressivistic draft events, thereby collecting and generating preliminary progressivistic draft data; a reinforced machine learning device, configured for analyzing the preliminary progressivistic draft data and identifying selected preliminary progressivistic draft events in the preliminary progressivistic draft data that attain a predetermined quality threshold, as quality assured progressivistic events; at least one automated progressivistic metadata logging module configured for encoding the quality assured progressivistic events into the progressivistic metadata file, in an automated manner.

In some embodiments at least one file of: the at least one source video file, the relative timecode file, the absolute timecode file, the progressivistic metadata file and a performance data file, are compiled into a singular file.

In some embodiments a timecode of the relative timecode file of the at least one source video file in the video files database is a timecode of the absolute timecode file in the timecode database or in which the timecode of the relative timecode file of the at least one source video file in the video files database is synchronizable or linkable to the timecode of the absolute timecode file in the timecode database.

According to some embodiments and aspects of the present invention, there is provided a method of collecting and processing progressivistic metadata including the steps of: providing an absolute timecode file, uniquely identifying at least one of: particular time-frames in a real-life event and distinct time-segments in the real-life event; providing access to a source video file, in which the source video file including a recording of the real-life event, in which the source video file further includes a relative timecode file; in which the particular time-frames and/or distinct time-segments of the real-life event in the absolute timecode file, stored in the timecode database, are respectively related to particular frames and/or distinct segments in the relative timecode file of the at least one source video file in the video files database; generating a progressivistic metadata file, in which events encoded into the progressivistic metadata file are respectively related to the particular time-frames and/or distinct time-segments in the absolute timecode file, in the absolute timecode file database; storing the progressivistic metadata file in a progressivistic metadata database.

In some embodiments the method for collecting and processing progressivistic metadata further includes providing a performance data module, configured for collecting and processing performance data, in which events logged into a performance data file are related to events encoded into the progressivistic metadata file.

In some embodiments the method for collecting and processing progressivistic metadata further includes providing a controllable playback of the source video file and encoding events into the progressivistic metadata file is performed by a human operator in a real-time or near real time regime.

In some embodiments the method for collecting and processing progressivistic metadata further includes: manually logging from a human-machine interface of a plurality of portable computing devices of a plurality of watchers of the real-life event, in a real-time regime, preliminary progressivistic draft events, thereby generating preliminary progressivistic draft data; analyzing the preliminary progressivistic draft data by a reinforced machine learning device and identifying selected preliminary progressivistic draft events in the preliminary progressivistic draft data that attain a predetermined quality threshold, as quality assured progressivistic events; encoding the quality assured progressivistic events into the progressivistic metadata file, in an automated manner.

In some embodiments the method for collecting and processing progressivistic metadata further includes analyzing the at least one source video file and identifying progressivistic metadata events in the at least one source video file in automated manner and encoding identified progressivistic metadata events into the progressivistic metadata file, by at least one automated progressivistic metadata logging module, including a reinforced machine learning device.

In some embodiments the method for collecting and processing progressivistic metadata further includes compiling into a singular file at least one file selected from: the at least one source video file, the relative timecode file, the absolute timecode file, the progressivistic metadata file and a performance data file.

In some embodiments a timecode of the relative timecode file of the at least one source video file in the video files database is a timecode of the absolute timecode file in the timecode database or in which the method further includes synchronizing or linking the timecode of the relative timecode file of the at least one source video file in the video files database with the timecode of the absolute timecode file in the timecode database.

In some embodiments the events encoded into the progressivistic metadata file include a predefined progressivistic parameter related to at least one of: a particular player, particular gamer, particular performer, particular team member, particular pair of team members, particular group of team members.

According to some embodiments and aspects of the present invention, there is provided a non-transitory computer-readable storage medium, having computer-executable instructions stored thereon which, when executed by a computer micro-processor, causing the micro-processor collecting and processing progressivistic metadata, the computer-executable instructions including: instructions causing the micro-processor obtaining and/or reading and/or generating an absolute timecode file, uniquely identifying at least one of: particular time-frames in a real-life event and distinct time-segments in the real-life event; instructions causing the micro-processor obtaining access to a source video file, in which the source video file including a recording of the real-life event, in which the source video file further includes a relative timecode file; in which the particular time-frames and/or distinct time-segments of the real-life event in the absolute timecode file, stored in the timecode database, are respectively related to particular frames and/or distinct segments in the relative timecode file of the at least one source video file in the video files database; instructions causing the micro-processor generating a progressivistic metadata file, in which events encoded into the progressivistic metadata file are respectively related to the particular time-frames and/or distinct time-segments in the absolute timecode file, in the absolute timecode file database; instructions causing the micro-processor storing the progressivistic metadata file in a progressivistic metadata database.

In some embodiments the computer-readable storage medium further includes the progressivistic metadata file.

According to some embodiments and aspects of the present invention, there is provided a system for collecting and processing progressivistic metadata including: a video file database, configured for storing a source video file, in which the video file including a recording of a real-life event; a timecode file database, configured for storing a timecode file, uniquely identifying at least one of: particular frames in the video file and distinct segments in the video file; the system is characterized by: a sub-system for collecting and processing progressivistic metadata including: a server configured for generating a progressivistic metadata file, in which events encoded into the progressivistic metadata file are respectively related to particular instances in the timecode file; a database configurable for storing the progressivistic metadata file.

In some embodiments the system for collecting and processing progressivistic metadata further includes a performance data module, configured for collecting and processing performance data, in which events logged into a performance data file are related to events encoded into the progressivistic metadata file.

In some embodiments the sub-system for collecting and processing progressivistic metadata further includes at least one progressivistic metadata interface, configured for encoding events into the progressivistic metadata file.

In some embodiments the sub-system for collecting and processing progressivistic metadata further includes at least one progressivistic metadata interface, configured for encoding events into the progressivistic metadata file, selected from: an interface, configured for manually logging events into the progressivistic metadata file, by a human operator; an interface configured for logging relations between the events encoded into the progressivistic metadata file and the events encoded into the performance data file; an interface configured for specifying an associative metric.

In some embodiments at least two selected from: a progressivistic metadata interface, the database configurable for storing the progressivistic metadata file, the server configured for generating the progressivistic metadata file, a performance data module and a performance data database are integrated or implemented separately on different computers interconnected by a computer network.

According to some embodiments and aspects of the present invention, there is provided a method of collecting and processing progressivistic metadata includes the steps of: providing a video file including a recording of a real-life event; providing a timecode file, configured for uniquely identifying at least one of: particular frames in the video file and distinct segments in the video file; generating a progressivistic metadata file, in which events encoded into the progressivistic metadata file are respectively related to particular instances in the timecode file; storing the progressivistic metadata file.

In some embodiments the method for collecting and processing progressivistic metadata further includes providing performance data file, in which events logged into the performance data file are related to events encoded into the progressivistic metadata file.

In some embodiments the method for collecting and processing progressivistic metadata further includes at least one step selected from: manually logging events into the progressivistic metadata file, by a human operator; defining possible relations between events encoded in the progressivistic metadata file and events encoded in a performance data file; specifying an associative metric.

In some embodiments the events logged into the progressivistic metadata file include at least one parameter selected from: field goals (FG), free throws (FT), three-point field goals (3FGM), rebounds (REB), offensive rebounds (OREB), defensive rebounds (DREB), assists (AST), steals (STL), blocks (BLK) turnovers (TO) and personal fouls (PF).

In some embodiments the method for collecting and processing progressivistic metadata further includes at least one postprocessing step selected from: editing the video file, in accordance with a specific event logged into the progressivistic metadata file; compiling the segments of the video file, in accordance with a specific event logged into the progressivistic metadata file; compiling the frames of the video file, in accordance with a specific event logged into the progressivistic metadata file; cutting out at least one of: the segments of the video file and the frames of the video file, associated with a specific event logged into the progressivistic metadata file; extracting at least one of: the segments of the video file and the frames of the video file, associated with a specific event logged into the progressivistic metadata file; presenting at least one of: the segments of the video file and the frames of the video file, associated with a specific event logged into the progressivistic metadata file.

In some embodiments the method for collecting and processing progressivistic metadata further includes at least one step selected from: performing an independent statistical analysis of the progressivistic metadata file; performing a relative statistical analysis includes a comparison of values of parameters in the progressivistic metadata file, to values of parameters in a performance data file; summing up of values of progressivistic metadata parameters; comparison of values of progressivistic metadata parameters; counting values of at least one parameter selected from: field goals (FG), free throws (FT), three-point field goals (3FGM), rebounds (REB), offensive rebounds (OREB), defensive rebounds (DREB), assists (AST), steals (STL), blocks (BLK) turnovers (TO) and personal fouls (PF), which are related to at least one parameter in the progressivistic metadata file selected from: field goal made (FGM), field goal attempted (FGA), steals (STL) or turnovers (TO); counting values for a particular player/team member; counting values for a particular group of players/team members; counting values for an entire team of players/team members; counting values for a portion of the event; counting values for entire the event; counting values for a season or series includes the event; comparing values of different events includes the event.

In some embodiments the method for collecting and processing progressivistic metadata further includes a lineup processing, including comparison of various values of parameters in the progressivistic metadata file, thereby determining a favorable combination of a group of players/team members and/or an entire team, for a predefined task.

In some embodiments the method for collecting and processing progressivistic metadata further includes the composite progressivistic metadata file, formed by performing the steps of the method.

According to some embodiments and aspects of the present invention, there is provided a non-transitory computer-readable storage medium, having computer-executable instructions stored thereon which, when executed by a computer micro-processor, causing the micro-processor collecting and processing progressivistic metadata, the computer-executable instructions including: instructions causing the micro-processor obtaining and/or reading a video file including a recording of a real-life event; instructions causing the micro-processor obtaining and/or reading a timecode file, configured for uniquely identifying at least one of: particular frames in the video file and distinct segments in the video file; instructions causing the micro-processor generating a progressivistic metadata file, in which events encoded into the progressivistic metadata file are respectively related to particular instances in the timecode file; instructions causing the micro-processor to store the progressivistic metadata file.

In some embodiments the computer-readable storage medium further includes instructions causing the micro-processor obtaining and/or reading a performance data file, in which events logged into the performance data are related to events encoded into the progressivistic metadata file.

In some embodiments the computer-readable storage medium further includes instructions causing the micro-processor collecting and recording progressivistic metadata, including at least one set of instructions selected from: instructions causing the micro-processor logging events into the progressivistic metadata file; instructions causing the micro-processor defining possible relations between events encoded in the progressivistic metadata file and events encoded in a performance data file; instructions causing the micro-processor specifying an associative metric.

In some embodiments the computer-readable storage medium further includes the progressivistic metadata file.

In some embodiments the computer-readable storage medium further includes at least one set of instructions selected from: instructions causing the micro-processor editing and/or compiling segments and/or frames of the video file, in accordance with a specific event logged into the progressivistic metadata file; instructions causing the micro-processor cutting out and/or extracting and/or presenting segments and/or frames of the video file, associated with a specific event logged into the progressivistic metadata file.

In some embodiments the computer-readable storage medium further includes at least one set of instructions selected from: instructions causing the micro-processor performing an independent statistical analysis of the progressivistic metadata in the progressivistic metadata file; instructions causing the micro-processor performing a relative statistical analysis includes a comparison of values of parameters in the progressivistic metadata to various values of parameters in a performance data file; instructions causing the micro-processor summing up and/or comparison of values of parameters in the progressivistic metadata file; instructions causing the micro-processor counting values of at least one parameter selected from: field goals (FG), free throws (FT), three-point field goals (3FGM), rebounds (REB), offensive rebounds (OREB), defensive rebounds (DREB), assists (AST), steals (STL), blocks (BLK) turnovers (TO) and personal fouls (PF), which are related to at least one parameter in the progressivistic metadata layer selected from: field goal made (FGM), field goal attempted (FGA), steals (STL) or turnovers (TO); instructions causing the micro-processor counting values for a particular player/team member and/or a group of players/team members and/or an entire team; instructions causing the micro-processor counting values for a portion of the event and/or entire the event and/or between different events and/or a series includes the event.

In some embodiments the computer-readable storage medium further includes a set of instructions causing the micro-processor performing a lineup processing, comparing values of parameters in the progressivistic metadata file, thereby determining a favorable combination of a group of players/team members and/or an entire team, for a predefined task.

Definitions

A timecode is a sequence of numeric codes generated at regular intervals by a timing synchronization system. Timecode is used in video production, show control and other application which require temporal coordination or logging of recording or actions. SMPTE timecode is used extensively for synchronization and for logging and identifying material in recorded media. This shot-logging process was traditionally done by hand using pen and paper but is now typically done using shot-logging software running on a laptop computer that is connected to the time code generator or the camera itself. The SMPTE family of timecodes are almost universally used in film, video and audio production, and can be encoded in many different formats, including: Linear timecode (LTC) in a separate audio track, Vertical interval timecode (VITC) in the vertical blanking interval of a video track, AES-EBU embedded timecode used with digital audio, burnt-in timecode in human-readable form in the video itself and CTL timecode.

A Keykode (written as KeyKode or KeyCode) is an Eastman Kodak Company advancement on edge numbers, which are letters, numbers and symbols placed at regular intervals along the edge of 35 mm and 16 mm film to allow for frame-by-frame specific identification. Keykode is a variation of timecode used in the post-production process which is designed to uniquely identify film frames in a film stock.

The terms event data, performance data or alike, as referred to herein, are to be construed as a data synchronized with a timecode or keycode, typically associated with a particular video file or a plurality of different particular video files. Event data includes information of logged events that actually occurred, for instance during a sport game or a sole performance. Examples of event data include the data collected and processed by the commercially available software Opta™.

The terms event and/or actually occurred and/or real-life event, as referred to herein, are to be construed as including any instance that had an actual occurrence in the real and/or physical world and/or metaphysical world, such as during teams sport, individual sport, team games, individual games, teams training sessions, individual training sessions, sole training sessions and sole performance sessions. The terms event and/or actually occurred and/or real-life event, as referred to herein, are to be construed as equally including any instance that had an occurrence in a metaphysical world and/or digital realm, such during teams or individual sport, teams or individual games, teams or individual training sessions and sole training or performance sessions that are conducted remotely and/or in online regime and/or over any type of distanced conferencing and/or within a framework of a podcast and/or during online gaming session and/or in a multiplayer video game, performed by a real individual person, a pair or group of real individuals, vis-à-vis another real individual opponent or competitor and/or together with at least one real individual team member or associate and/or in the presence of a real individual trainer, coach, teacher or instructor. The terms event and/or actually occurred and/or real-life event, as referred to herein, are to be construed as equally including any instance that had an occurrence in the metaphysical world and/or digital realm, such during teams or individual sport, teams or individual games, teams or individual training sessions and sole training or performance sessions that are conducted remotely and/or in online regime and/or over any type of distanced conferencing and/or within a framework of a podcast and/or during online gaming session and/or in a multiplayer video game, performed by a real individual person, a pair or group of real individuals, with a virtual entity, such as an avatar, wherein the interaction in a non-limiting manner including: a virtual opponent or competitor and/a virtual team member or associate and/or a virtual trainer, coach, teacher or instructor.

The term sport, as referred to herein, is to be construed as including E-Sports, which is an abbreviation of electronic sports, is to be construed as including any form of competition using video games, in a non-limiting manner such in the form of organized, multiplayer video game competitions, particularly between professional players, individually or as teams.

The term progressivistic metadata, as referred to herein, is to be construed as a metadata synchronized with a timecode or keycode, which is typically associated with a particular video file or a plurality of different particular video files, including logged information of events that has not occurred during the occurrence of a real-life event. For the sake of clarity, it is further specified that progressivistic metadata is defined as logged information of events that have not taken place during the occurrence of a real-life event, such as a sport game, regardless of whether the progressivistic metadata layer was encoded during the event, e.g. in a real-time regime, or after a predefined delay and/or near real-time regime, i.e. a postponed mode), or at any time after the completion of the occurrence of a real-life event, such as a sport game. For the sake of clarity, it is yet further specified that progressivistic metadata is defined as logged information of events that has not occurred during the occurrence of a real-life event, such as sport game, regardless the identity of the person, machine or entity actually logging the entries of the information of the progressivistic events that has not occurred during the occurrence of a real-life event, whether player, team member, trainer, scouter, fan, participant, watcher, analyst, machine learning system, crowd, etc.

The term field goal, as referred to herein, is to be construed as a basket scored on any shot or tap other than a free throw, worth two or three points depending on the distance of the attempt from the basket. The term field goal may include field-goals made (FGM), field-goals attempted (FGA) and field goal percentage (FG %). Uncommonly, a field goal can be worth other values such as one point in FIBA 3×3 basketball competitions or four points in the BIG3 basketball league. "Field goal" is the official terminology used by the National Basketball Association (NBA) in their rule book, in their box scores and statistics, and in referees' rulings. The same term is also the official wording used by the National Collegiate Athletic Association (NCAA) and high school basketball.

The term turnover, frequently presented by the acronym TO, as referred to herein, is to be construed as a situation in basketball where a team loses possession of the ball to the opposing team before a player takes a shot at their team's basket. This can result from the ball being stolen, the player making mistakes such as stepping out of bounds, illegal screen, a double dribble, having a pass intercepted, throwing the ball out of bounds, three-second violation, five-second violation, or committing an error such as traveling, a shot clock violation, palming, a backcourt violation, or committing an offensive foul.

The term steal, frequently presented by the acronym STL, as referred to herein, is to be construed as a situation in basketball where a defensive player legally causes a turnover by his positive, aggressive action. A steal can be done by deflecting and controlling, or by catching the opponent's pass or dribble of an offensive player. The defender must not touch the offensive player's hands or otherwise a foul is called. Steals are credited to the defensive player who first causes the turnover, even if he does not end up with possession of the live ball. To earn a steal, the defensive player must be the initiator of the action causing the turnover, not just the benefactor. Whenever a steal is recorded by a defensive player, an offensive player must be credited as committing a turnover.

The term storage as referred to herein is to be construed as including one or more of volatile or non-volatile memory, hard drives, flash storage devices and/or optical storage devices, e.g. CDs, DVDs, etc. The term "computer-readable media" as referred to herein can include transitory and non-transitory computer-readable instructions, whereas the term "computer-readable storage media" includes only non-transitory readable storage media and excludes any transitory instructions or signals. The terms "computer-readable media" and "computer-readable storage media" encompass only a computer-readable media that can be considered a manufacture (i.e., article of manufacture) or a machine. Computer-readable storage media includes "computer-readable storage devices". Examples of computer-readable storage devices include volatile storage media, such as RAM, and non-volatile storage media, such as hard drives, optical discs, and flash memory, among others.

The term integrated shall be construed inter alia as operable on the same machine and/or executed by the same computer program. Depending on the actual deployment of the method, its implementation and topology, integration of agents and/or integration into modules as well as the terms "transfer", "relaying", "transmitting", "forwarding", "retrieving", "accessing", "pushed" or similar refer to any interaction between agents via methods inter alia including: function calling, Application Programming Interface (API), Inter-Process Communication (IPC), Remote Procedure Call (RPC) and/or communicating using of any standard or proprietary protocol, such as SMTP, IMAP, MAPI, OMA-IMPS, OMA-PAG, OMA-MWG, SIP/SIMPLE, XMPP, SMPP.

The term network, as referred to herein, should be understood as encompassing any type of computer and/or data network, in a non-limiting manner including one or more intranets, extranets, local area networks (LAN), wide area networks (WAN), wireless networks (WIFI), the Internet, including the world wide web, and/or other arrangements for enabling communication between the computing devices, whether in real time or otherwise, e.g., via time shifting, cashing, batch processing, etc.

The term relational database, as referred to herein, should be construed as any digital database based on the relational model of data, as proposed by E. F. Codd in 1970. A software system used to maintain relational databases is a Relational Database Management System (RDBMS). Typically, relational database systems use Structured Query Language (SQL) for querying and maintaining the database.

The term computing device or alike, as referred to herein, is to be construed as including, in its most basic configuration, at least one processing unit and a memory. Depending on the exact configuration and type of computing device, the memory may be volatile, such as random access memory (RAM), non-volatile, such as read-only memory (ROM), flash memory, etc., or any combination thereof.

The term portable computing device, as referred to herein, is to be construed as including any type of mobile personal devices, such as smartphones, tablets, personal digital assistant (PDA) devices or personal portable computers, colloquially also known as notebooks or laptops. Portable computing devices are typically configured to perform data communication over telecommunication or cellular networks, as well as usually enabled with automated geolocation services.

Whenever the terms server, agent, system or module is used herein, it should be construed as a computer program, including any portion or alternative thereof, e.g. script, command, application programing interface (API), graphical user interface (GUI), etc., and/or computational hardware components, such as logic devices and application integrated circuits, computer storage media, computer micro-processors and random access memory (RAM), a display, input devices and networking terminals, including configurations, assemblies or sub-assemblies thereof, as well as any combination of the former with the latter.

Telecommunication or cellular network, as referred to herein, should be understood as encompassing any type of mobile telephony system and particularly cellular networks. Instances of mobile telephony systems inter alia include networks compliant with standards know in the art as: MTS, MTA, MTB, MTC, IMTS, MTD, AMTS, OLT, Autoradiopuhelin, AMPS, TACS, ETACS, NMT, Hicap, Mobitex, DataTAC, GSM, CSD, 3GPP2, CdmaOne (IS-95), D-AMPS (IS-54 and IS-136), CDPD, iDEN, PDC, PHS, GSM/3GPP, HSCSD, GPRS, EDGE/EGPRS, 3GPP2, CDMA2000 1×RTT (IS-2000), WiDEN, 3G (IMT-2000), 3GPP, UMTS (UTRAN), WCDMA-FDD, WCDMA-TDD, UTRA-TDD LCR (TD-SCDMA), 3GPP2, CDMA2000 1×EV-DO (IS-856), HSDPA, HSUPA, HSPA+, LTE (E-UTRA), EV-DO Rev.A, EV-DO Rev.B, Mobile WiMAX (IEEE 802.16e-2005), Flash-OFDM, IEEE 802.20, LTE Advanced and IEEE 802.16.

The terms notification and/or message as used herein refer to a communication provided by a notification system to a message recipient device. A notification and/or message may be used to inform one or more recipient device, for example a notification and/or messages may be provided to the one or more recipient device, in a non-limiting manner using SMS texts, MMS texts, E-mail, Instant Messages, mobile device push notifications, HTTP requests, voice calls, telephone calls, Voice Over IP (VOIP) calls or alike, library function calls, API calls, URLs as well as any signals transferred, transmitted or relayed, as defined herein or any combination thereof.

The term conversational agent, as referred to herein, shall be construed as encompassing any type of real-time messaging service, in a non-limiting manner including any dialog system is a computer system intended to converse with a human, with a coherent structure, inter alia employing text, speech, graphics, haptics, gestures and other modes for communication on both the input and output channel. The typical GUI wizard does engage in some sort of dialog, but it includes very few of the common dialog system components, and dialog state is trivial. There are many different architectures for dialog systems.

The terms levels, as referred to herein, should be understood as complementary levels of analysis, known in cognitive science as Marr's Tri-Level Hypothesis, including a high-level or computational level, concerned with what does the system do or what problems does it solve or overcome and alike, why does it do these things; an algorithmic level or representational level, concerned with how does the system do what it does, specifically, what data does it use and what processes does it employ to build and manipulate the data; and an implementational or physical level, concerned with how is the process physically realized and set forth to actual implementation, as detailed by Dawson, Michael R W at al. in Understanding Cognitive Science, by Blackwell Publishing, 1998 Nov. 2.

The term real-time as referred to herein shall be construed as including a reasonable acceptable delay, without breaking communication and/or stopping the fluent exchange of messages and/or correlation to occurred event. In some preferred embodiments real-time is limited to the range of zero to about 15 seconds, after which a near real-time period begins that typically lasts for up to a minute but in some instances can last until several minutes.

The term learning as referred to herein is to be construed as including the identification and training of suitable algorithms to accomplish tasks of interest. The term learning includes, but is not restricted to, association learning, classification learning, clustering, and numeric prediction.

The term machine learning as used herein refers to the field of the computer sciences that studies the design of computer programs able to induce patterns, regularities, or rules from past experiences to develop an appropriate response to future data, or describe the data in some meaningful way. By "machine learning" algorithms, in the context of this invention, it is meant association rule algorithms (e.g. Apriori, discriminative pattern mining, frequent pattern mining, closed pattern mining, colossal pattern mining, and self-organizing maps), feature evaluation algorithms (e.g. information gain, Relief, Relief F, RReliefF, symmetrical uncertainty, gain ratio, and ranker), subset selection algorithms (e.g. wrapper, consistency, classifier, correlation-based feature selection CFS), support vector machines, Bayesian networks, classification rules, decision trees, neural networks, instance-based algorithms, other algorithms that use the herein listed algorithms (e.g. vote, stacking, cost-sensitive classifier) and any other algorithm in the field of the computer sciences that relates to inducing patterns, regularities, or rules from past experiences to develop an appropriate response to future data, or describing the data in some meaningful way.

The term learning model as referred to herein is to be construed as including a collection of parameters and functions, where the parameters are trained on a set of training samples. The parameters and functions may be a collection of linear algebra operations, non-linear algebra operations, and tensor algebra operations. The parameters and functions may include statistical functions, tests, and probability models. The training samples can correspond to samples having measured properties of the sample, as well as known classifications/labels. The model can learn from the training samples in a training process that optimizes the parameters (and potentially the functions) to provide an optimal quality metric (e.g., accuracy) for classifying new samples. The training function can include expectation maximization, maximum likelihood, Bayesian parameter estimation methods such as markov chain monte carlo, gibbs sampling, hamiltonian monte carlo, and variational inference, or gradient based methods such as stochastic gradient descent and the Broyden-Fletcher-Goldfarb-Shanno (BFGS) algorithm. Example parameters include weights (e.g., vector or matrix transformations) that multiply values, e.g., in regression or neural networks, families of probability distributions, or a loss, cost or objective function that assigns scores and guides model training. Example parameters include weights that multiple values, e.g., in regression or neural networks. A model can include multiple submodels, which may be different layers of a model or independent model, which may have a different structural form, e.g., a combination of a neural network and a support vector machine (SVM).

The term "machine learning model" refers to a trained computational model that is built from a training process in the machine learning from the data. The trained machine learning model is applied during the predication (inference) stage by the computer that gives computer the capability to perform certain tasks (e.g. detect and classify the objects) on its own. Examples of machine learning models include ResNet, DenseNet, etc. which are also named as "deep learning models" because of the layered depth in their network structure. Examples of machine learning models include, kernel-based regressions, adaptive basis regression or classification, Bayesian methods, ensemble methods, logistic regression and extensions, Gaussian processes, support vector machines (SVMs), a probabilistic model, and a probabilistic graphical model. A machine learning model can further include feature engineering (e.g., gathering of features into a data structure such as a 1, 2, or greater dimensional vector) and feature representation (e.g., processing of data structure of features into transformed features to use in training for inference of a classification).

The term neural network as referred to herein is to be construed as including a machine learning model patterned after a network of non-biological neurons that can be trained to learn non-linear functions based on training input. In particular, the term neural network can include a model of interconnected digital neurons that communicate and learn to approximate complex functions and generate outputs based on inputs provided to the model. A neural network can include an algorithm that implements deep learning techniques, that is, machine learning that utilizes a set of algorithms to attempt to model high-level abstractions in data. A neural network can include a variety of deep learning models, including convolutional neural networks, deep belief networks, or deep stacking networks.

The term regression model as referred to herein is to be construed as including a statistical model for estimating relationship among parameters. For instance, a "regression model" includes a linear regression or a logistic regression that estimates a parameter for a function based on independent variables. A regression model may likewise use Stochastic Gradient Descent, Adaptive Gradient Algorithm ("AdaGrad"), Adaptive Moment Estimation ("Adam"), Alternating Direction Method of Multipliers ("ADMM"), or other optimization algorithms.

The term "convolution" refers to a particular mathematical operation on two functions (f and g) to produce a third function that expresses how the shape of one is modified by the other.

The term "convolutional neural network" refers to a class of multilayer feed-forward artificial neural networks, most commonly applied to analyzing visual images utilizing convolution in its operations.

The terms method and process as used herein are to be construed as including any sequence of steps or constituent actions, regardless a specific timeline for the performance thereof. The particular steps or constituent actions of any given method or process are not necessarily in the order they are presented in the claims, description or flowcharts in the drawings, unless the context clearly dictates otherwise. Any particular step or constituent action included in a given method or process may precede or follow any other particular step or constituent action in such method or process, unless the context clearly dictates otherwise. Any particular step or constituent action and/or a combination thereof in any method or process may be performed iteratively, before or after any other particular step or action in such method or process, unless the context clearly dictates otherwise. Moreover, some steps or constituent actions and/or a combination thereof may be combined, performed together, performed concomitantly and/or simultaneously and/or in parallel, unless the context clearly dictates otherwise. Moreover, some steps or constituent actions and/or a combination thereof in any given method or process may be skipped, omitted, spared and/or opted out, unless the context clearly dictates otherwise.

In the specification or claims herein, any term signifying an action or operation, such as: a verb, whether in base form or any tense, gerund or present/past participle, is not to be construed as necessarily to be actually performed but rather in a constructive manner, namely as to be performed merely optionally or potentially.

The term substantially as used herein is a broad term, and is to be given its ordinary and customary meaning to a person of ordinary skill in the art (and is not to be limited to a special or customized meaning), and refers without limitation to being largely but not necessarily entirely of that quantity or quality which is specified.

The term essentially means that the composition, method or structure may include additional ingredients, stages and or parts, but only if the additional ingredients, the stages and/or the parts do not materially alter the basic and new characteristics of the composition, method or structure claimed.

As used herein, the term essentially changes a specific meaning, meaning an interval of plus or minus ten percent (±10%). For any embodiments disclosed herein, any disclosure of a particular value, in some alternative embodiments, is to be understood as disclosing an interval approximately or about equal to that particular value (i.e., ±10%).

As used herein, the terms about or approximately modify a particular value, by referring to a range equal to the particular value, plus or minus twenty percent (+/−20%). For any of the embodiments, disclosed herein, any disclosure of a particular value, can, in various alternate embodiments, also be understood as a disclosure of a range equal to about that particular value (i.e. +/−20%).

As used herein, the term or is an inclusive or operator, equivalent to the term and/or, unless the context clearly dictates otherwise; whereas the term and as used herein is also the alternative operator equivalent to the term and/or, unless the context clearly dictates otherwise.

It should be understood, however, that neither the briefly synopsized summary nor particular definitions hereinabove are not to limit interpretation of the invention to the specific forms and examples but rather on the contrary are to cover all modifications, equivalents and alternatives falling within the scope of the invention.

DESCRIPTION OF THE DRAWINGS

The present invention will be understood and appreciated more comprehensively from the following detailed description taken in conjunction with the appended drawings in which:

FIG. 1 is schematic representation of the structure of a file including an event data layer synchronized with a timecode or keykode of a video file, according to prior art;

FIG. 2 is a schematic representation of the structure of a file including an event data layer and progressivistic metadata layer, synchronized with a timecode or keykode of a video file, according to some embodiments of the present invention;

Figure 3:
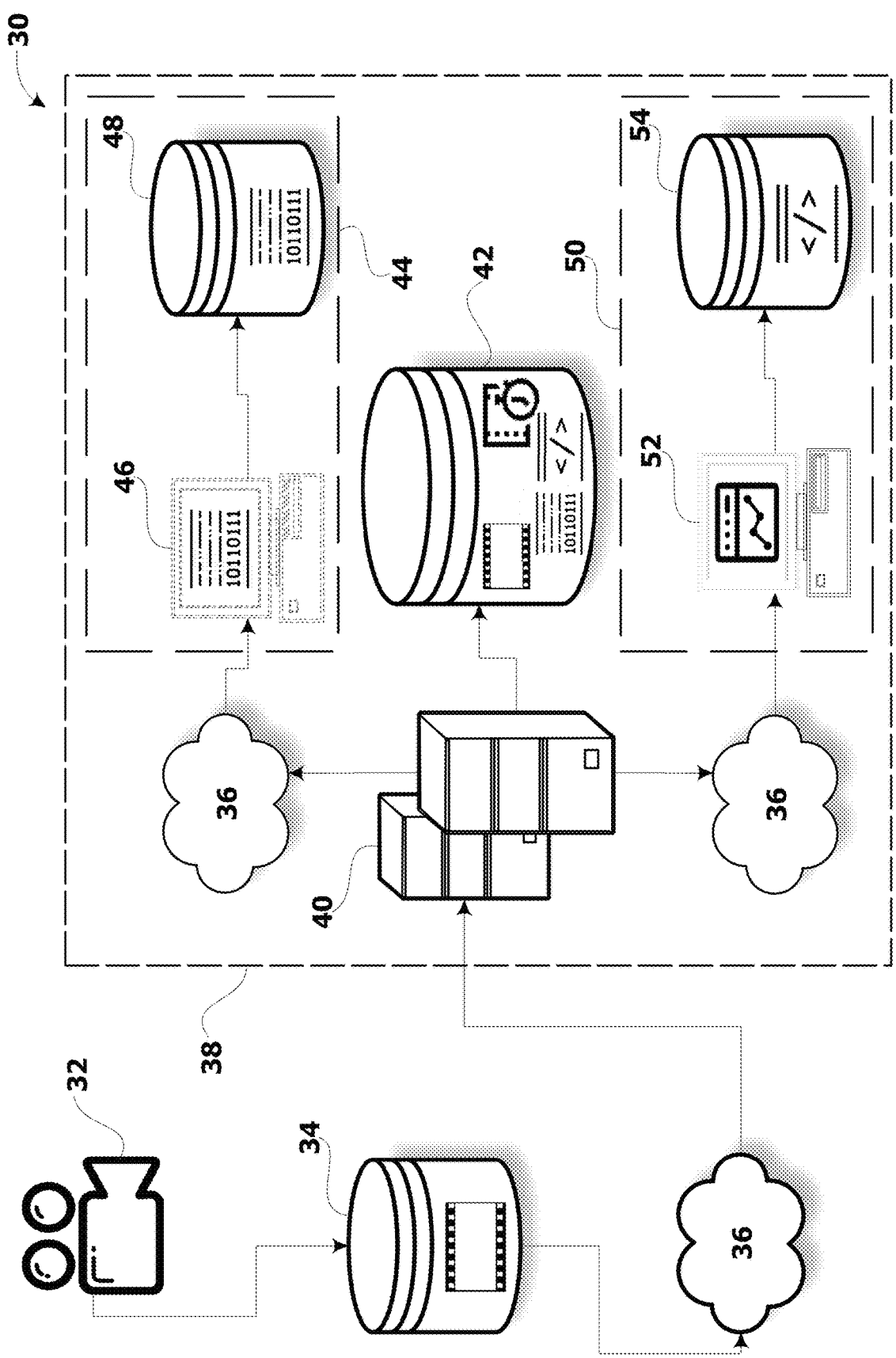
FIG. 3 is schematic block-diagram of a system for collecting and processing progressivistic metadata, according to some embodiments of the present invention.

While the invention is susceptible to various modifications and alternative forms, specific embodiments thereof have been shown merely by way of example in the drawings. The drawings are not necessarily complete and not all components are definitely shown; emphasis instead being placed upon clearly illustrating the principles underlying the present invention.

DETAILED DISCLOSURE OF EMBODIMENTS

Illustrative embodiments of the invention are described below. In the interest of clarity, not all features of actual implementation are described in this specification. It will of course be appreciated that in the development of any such actual embodiment, numerous implementation-specific decisions must be made to achieve the developers' specific goals, such as compliance with technology- or business-related constraints, which may vary from one implementation to another. Moreover, it will be appreciated that the effort of such a development might be complex and time-consuming, but would nevertheless be a routine undertaking for those of ordinary skill in the art having the benefit of this disclosure.

Prior to elaborating any embodiment of the present invention, in order to present the background for the inventive concept more clearly, reference is firstly made to FIG. 1 showing schematic representation of the structure of a composite file 10, known in the art. Composite prior art file 10 includes video file layer 16, which is optionally a recording of a sport event. Video file layer 16 is optionally a recording of a broadcast or podcast stream of a sport event and may include an edited video stream, selectively compiled from a plurality of video streams recorded by different video cameras.

Composite file 10 further includes a timecode or keykode layer 14, as defined hereinabove. In some examples, timecode layer 14 is encoded directly into and/or forming a part of and/or otherwise combined with video file layer 16. Timecode layer 14 is configured to uniquely identify particular frames or at least distinct segments in video file layer 16.

Composite file 10 further includes an event or performance data layer 12, as defined hereinabove. Performance data layer 12 comprises a plurality of logged events that are recorded in video file layer 16. The events logged in performance data layer 12 are synchronized to timecode layer 14, so that each particular event logged in performance data layer 12 is traceable or otherwise associated with respective frames in video file layer 16. The events logged into performance data layer 12 are typically associated with a particular player and/or team member. Examples of composite file 10 with an event data layer include the files generated by commercially available software Opta™, discussed in a more detail by Eigil Hakedal Skjæveland referenced herein. The content of the Eigil Hakedal Skjæveland Master's Thesis on Identifying Higher-Level Semantics in Football Event Data is hereby incorporated herein in its entirety by this reference.

The events logged in performance data layer 12 typically include positive as well as negative events. Examples of positive events include a field goal made (FGM) in basketball, whereas examples of negative events include a missed field goa, namely an attempted field goal (FGA) that did not end up with a field goal made (FGM). Others examples of positive events include a steal (STL) in basketball, whereas a respective example of a negative event may include a turnover (TO).

In accordance with some embodiments of the present invention, reference is now made to FIG. 2, showing schematic representation of the structure of a composite file 20. Similarly to the prior art composite file 10, shown in FIG. 1, composite file 20 shown in FIG. 2 includes video file layer 16 of a sport event, timecode layer 14 and performance data layer 12, typically including positive, attempted and/or negative encoded events. Contradistinctively to prior art composite file 10 shown in FIG. 1, composite file 20 shown in FIG. 2, additionally to video file layer 16, timecode layer 14 and event data layer 12, includes progressivistic metadata layer 22.

Progressivistic metadata layer 22 includes a plurality of logged events that has not occurred during the sporting game recorded in video file layer 16. The events logged in progressivistic metadata layer 22 are synchronized to timecode layer 14, so that each particular event logged in progressivistic metadata layer 22 is traceable or otherwise associated with respective frames in video file layer 16. The events logged into progressivistic metadata layer 22 are typically associated with a particular player and/or team member.

It is further noted that contradistinctively to prior art composite file 10 shown in FIG. 1, a plurality of different events are optionally encoded into progressivistic metadata layer 22 of composite file 20 shown in FIG. 2, for a particular instance in timecode layer 14, so that several logged events in progressivistic metadata layer 22 correspond or otherwise are associated with the same frame or set of frames in video file layer 16.

The events logged into progressivistic metadata layer 22 are typically associated with a particular player and/or team member. An event encoded into progressivistic metadata layer 22 of composite file 20 is preferably correlated to an event encoded into performance data layer 12, where both events are typically synchronized to the same instance in timecode layer 14, so that both events, the event logged in performance data layer 12 as well as the event logged in progressivistic metadata layer 22, are traceable or otherwise associated with the same frame or set of frames in video file layer 16. An event encoded into progressivistic metadata layer 22 of composite file 20 is optionally non-correlated to any event encoded into performance data layer 12.

Examples of events logged into progressivistic metadata layer 22, of composite file 20 shown in FIG. 2, optimally include the same types of events, which are recorded in performance data layer 12, such as field goals (FG), free throws (FT), three-point field goals (3FGM), rebounds (REB), offensive rebounds (OREB), defensive rebounds (DREB), assists (AST), steals (STL), blocks (BLK) turnovers (TO) and personal fouls (PF), in basketball. Events logged into progressivistic metadata layer 22 of composite file 20 typically do not include the distinction between positive and negative events, contradistinctively to performance data layer 12 of prior art composite file 10 shown in FIG. 1.

Events logged in progressivistic metadata layer 22 of composite file 20 typically do not include the distinction between made events, attempted events and percentage, contradistinctively to the events in performance data layer 12 of prior art composite file 10 shown in FIG. 1. Events logged into progressivistic metadata layer 22 of composite file 20 optionally include an associative metric, such as a proposed reasoning for occurrence of a particular event logged into progressivistic metadata layer 22 or any other miscellaneous alphanumerical data associated with a particular event logged into progressivistic metadata layer 22.

In accordance with some embodiments of the present invention, reference is now made to FIG. 3, showing a system 30 for collecting and processing progressivistic metadata. System 30 includes video file source 32. Video file source 32 optionally includes a recording of a stream of a sport event. Video file source 32 optionally comprises an interface configured for transferring a video file to video files database 34. It is noted that the interface of video file source 32 is optionally an online interface, providing an access to system 30 and/or video files database 34. The video file is transferable from the interface of video file source 32 to system 30 and/or video files database 34 in a non-limiting manner by uploading the video file to system 30 and/or video files database 34.

Video file source 32 is typically connected to video files database 34. The video files in video files database 34 optionally further includes a timecode layer, as defined hereinabove, directly into and/or forming a part of and/or otherwise combined with a video file layer, configured to uniquely identify particular frames or at least distinct segments in the video file layer.

The video files in video files database 34 are optionally transferable via computer network 36 to sub-system 38 for collecting and processing progressivistic metadata. Sub-system 38 includes server 40 for processing progressivistic metadata and database 42 for storing composite files including a progressivistic metadata layer. Since the events encoded into the progressivistic metadata layer are related to particular instances in the timecode layer as well as optionally corelated to various events encoded into the performance data layer, database 42 for storing composite files is typically a relational database, as defined hereinabove. Server 40 typically includes a relational database management system (RBDMS) of database 42.

Sub-system 38 for collecting and processing progressivistic metadata optionally includes performance data module 44, configured for collecting and recording performance data. Performance data module 44 typically includes computational device 46, configured for generating and recording the performance data layer. In some embodiments, computational device 46 optionally includes a monitor, configured to display the video file, obtained via computer network 36 from video files database 34 and an interface, configured for manually logging events into performance data layer, by a human operator. In some embodiments, computational device 46 implements an artificial intelligence algorithm, configured for automated logging of events into performance data layer.

Performance data module 44 optionally includes performance data database 48, configured for temporarily storing and/or cashing composite files, such as composite file 10 shown in FIG. 1, with performance data layer having events encoded thereto, generated by computational device 46. In some embodiments, however, sub-system 38 for collecting and processing receives prepared composite files, such as composite file 10 shown in FIG. 1, with performance data layer having events encoded thereto, via computer network 36, such as event data generated by commercially available software Opta™, discussed in a more detail by Eigil Hakedal Skjæveland referenced herein. Therefore performance data module 44, computational device 46 and performance data database 48 are merely optional.

Sub-system 38 for collecting and processing progressivistic metadata includes progressivistic metadata module 50, configured for collecting and recording progressivistic metadata. Progressivistic metadata module 50 typically includes computational device 52, configured for generating and recording the progressivistic metadata layer. In some embodiments, computational device 52 optionally includes a monitor, configured to display the video file as well as optionally the performance data, obtained via computer network 36 from server 40 for processing progressivistic metadata and/or database 42 for storing composite files including a progressivistic metadata layer and/or performance data module 44 and/or computational device 46 and/or performance data database 48.

In some embodiments, computational device 52 includes an interface, configured for manually logging events into progressivistic metadata layer, by a human operator. In some embodiments, the interface of computational device 52, configured for manually logging events into progressivistic metadata layer, is further implemented for defining possible relations between the events encoded in the progressivistic metadata layer and events encoded in the performance data layer as well as for specifying the associative metric, as set forth hereinabove.

Progressivistic metadata module 50 optionally includes progressivistic metadata database 54, configured for temporarily storing and/or cashing composite files, such as composite file 20 shown in FIG. 2, with the progressivistic metadata layer having events encoded thereto, generated by computational device 52 or at least the progressivistic metadata component of such composite file.

It is noted that at least two of the following constituents: progressivistic metadata module 50, computational device 52, progressivistic metadata database 54, server 40 for processing progressivistic metadata and/or database 42 for storing composite files including a progressivistic metadata layer and/or performance data module 44 and/or computational device 46 and/or performance data database 48 are optionally integrated or implemented separately, on different computers interconnected by computer network 36.

Figure 4:
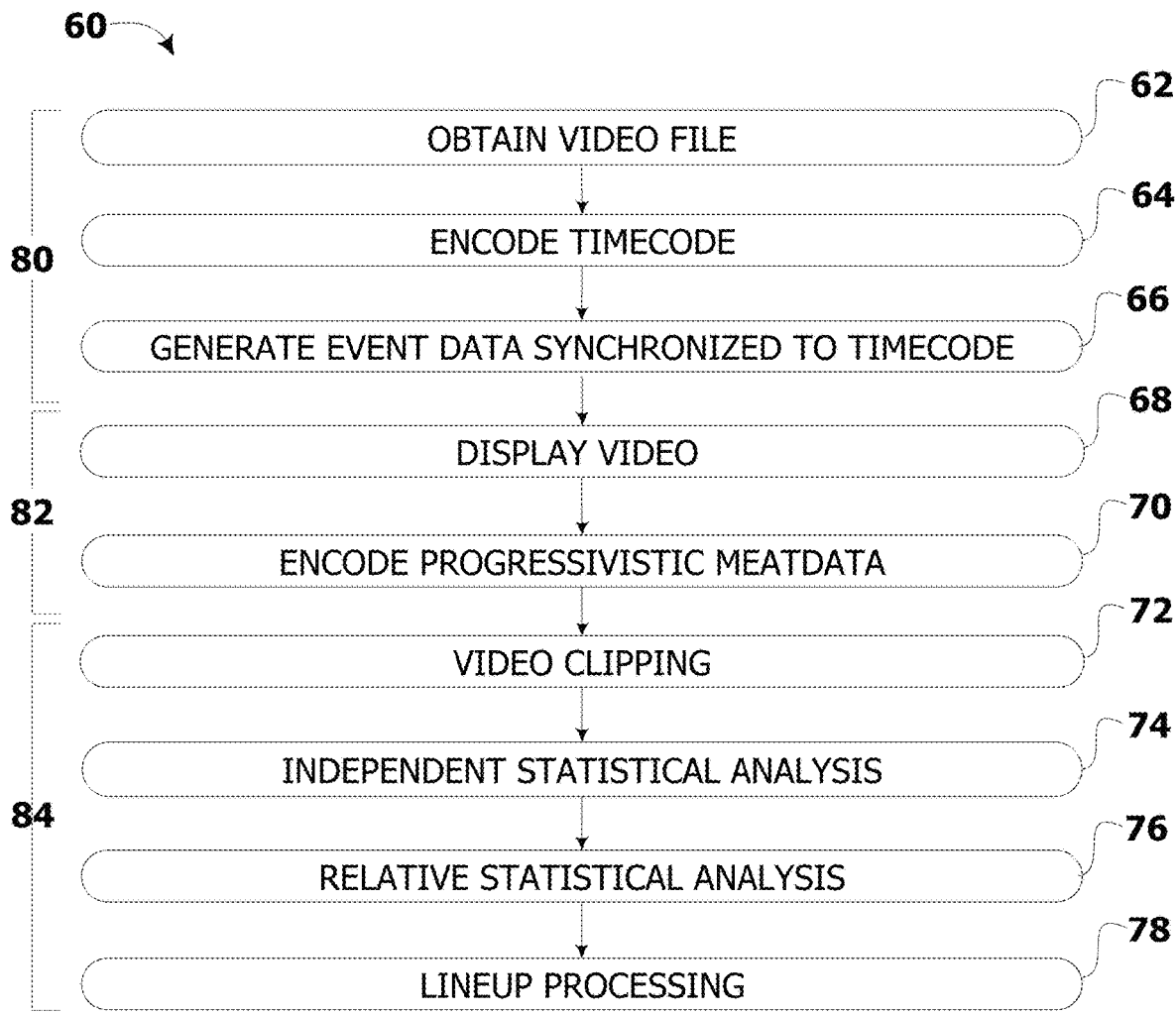
FIG. 4 is an algorithmic level flowchart of a method for collecting and processing progressivistic metadata, according to some embodiments of the present invention.

In accordance with some embodiments of the present invention, reference is now made to FIG. 4, showing an algorithmic level flowchart of method 60 for collecting and processing progressivistic metadata. Method 60 commences with optional pre-processing phase 80, which optionally includes obtaining a video file at step 62. Then a timecode layer, as defined hereinabove, is optionally encoded at step 64 into video files obtained at step 62.

The video file with timecode encoded hereto at step 64 is then processed, at step 66, so that event data layer is generated and synchronized with timecode. Pre-processing phase 80 of method 60 typically ends up at step 66. As prepared composite files, such as composite file 10 shown in FIG. 1, with performance data layer having events encoded thereto, is optionally procurable from commercially available software Opta™, discussed in a more detail by Eigil Hakedal Skjæveland referenced herein, pre-processing phase 80 of method 60 and/or steps 62, 64 and 66 are merely optional.

Method 60 further includes processing phase 82, which typically includes step 68 of displaying video file as well as optionally the performance data, obtained and/or generated during pre-processing phase 80. Processing phase 82 of method 60 further includes step 70 of manually logging events into progressivistic metadata layer, by a human operator. Examples of events logged into progressivistic metadata layer at step 70, in a non-limiting manner, include field goals (FG), free throws (FT), three-point field goals (3FGM), rebounds (REB), offensive rebounds (OREB), defensive rebounds (DREB), assists (AST), steals (STL), blocks (BLK) turnovers (TO) and personal fouls (PF), in basketball.

In some embodiments, step 70 of processing phase 82 further includes logging possible relations between the events encoded in the progressivistic metadata layer and events encoded in the performance data layer as well as for specifying the associative metric, as set forth hereinabove.

Method 60 preferably includes post-processing phase 84. Post-processing phase 84 of method 60 optionally includes step 72 of clipping. Clipping step 72 optionally includes editing and/or compiling segments/frames of the video layer, in accordance with a specific event logged in the progressivistic metadata layer. Clipping step 72 optionally includes cutting out and/or extracting and/or presenting segments/frames of the video layer, associated with a specific event logged in the progressivistic metadata layer.

Post-processing phase 84 of method 60 optionally further includes step 74 of independent statistical analysis. Independent statistical analysis of step 74 typically includes summing up and/or comparison of the values of various progressivistic metadata parameters within themselves and to, between or among themselves. Examples of independent statistical analysis performed of step 74 include counting the values of parameters such as field goals (FG), free throws (FT), three-point field goals (3FGM), rebounds (REB), offensive rebounds (OREB), defensive rebounds (DREB), assists (AST), steals (STL), blocks (BLK) turnovers (TO) and personal fouls (PF), in basketball, for a particular player/team member and/or a group of players/team members and/or the entire team, for a portion of a game and/or entire game, as well as the comparison of values of such parameters between different games, seasons, etc.

Post-processing phase 84 of method 60 optionally further includes step 76 of relative statistical analysis. Relative statistical analysis of step 76 typically includes comparison of values of various progressivistic metadata parameters to values of various performance data parameters. In some embodiments, relative statistical analysis of step 76 typically includes comparison of values of various progressivistic metadata parameters, within themselves and/or to, between or among themselves, for which at step 70 of processing phase 82 relations have been logged between the events encoded in the progressivistic metadata layer and events encoded in the performance data layer.

Examples of relative statistical analysis performed of step 76 include counting the values of parameters in the progressivistic metadata layer such as field goals (FG), free throws (FT), three-point field goals (3FGM), rebounds (REB), offensive rebounds (OREB), defensive rebounds (DREB), assists (AST), steals (STL), blocks (BLK) turnovers (TO) and personal fouls (PF), which are related to the values of parameters in the progressivistic metadata layer such as field goal made (FGM), field goal attempted (FGA), steals (STL) or turnovers (TO).

Post-processing phase 84 of method 60 optionally further includes step 78 of lineup processing. Lineup processing of step 78 typically includes comparison of values of various progressivistic metadata parameters within themselves and/or to, between or among themselves and/or to values of various performance data parameters, for determining the most favorable combination of a group of players/team members and/or the entire team, for a particular task. Examples of lineup processing of step 78 includes picking up an optimal lineup of players/team members, inter alia based on financial and/or commercial considerations.

Figure 5:
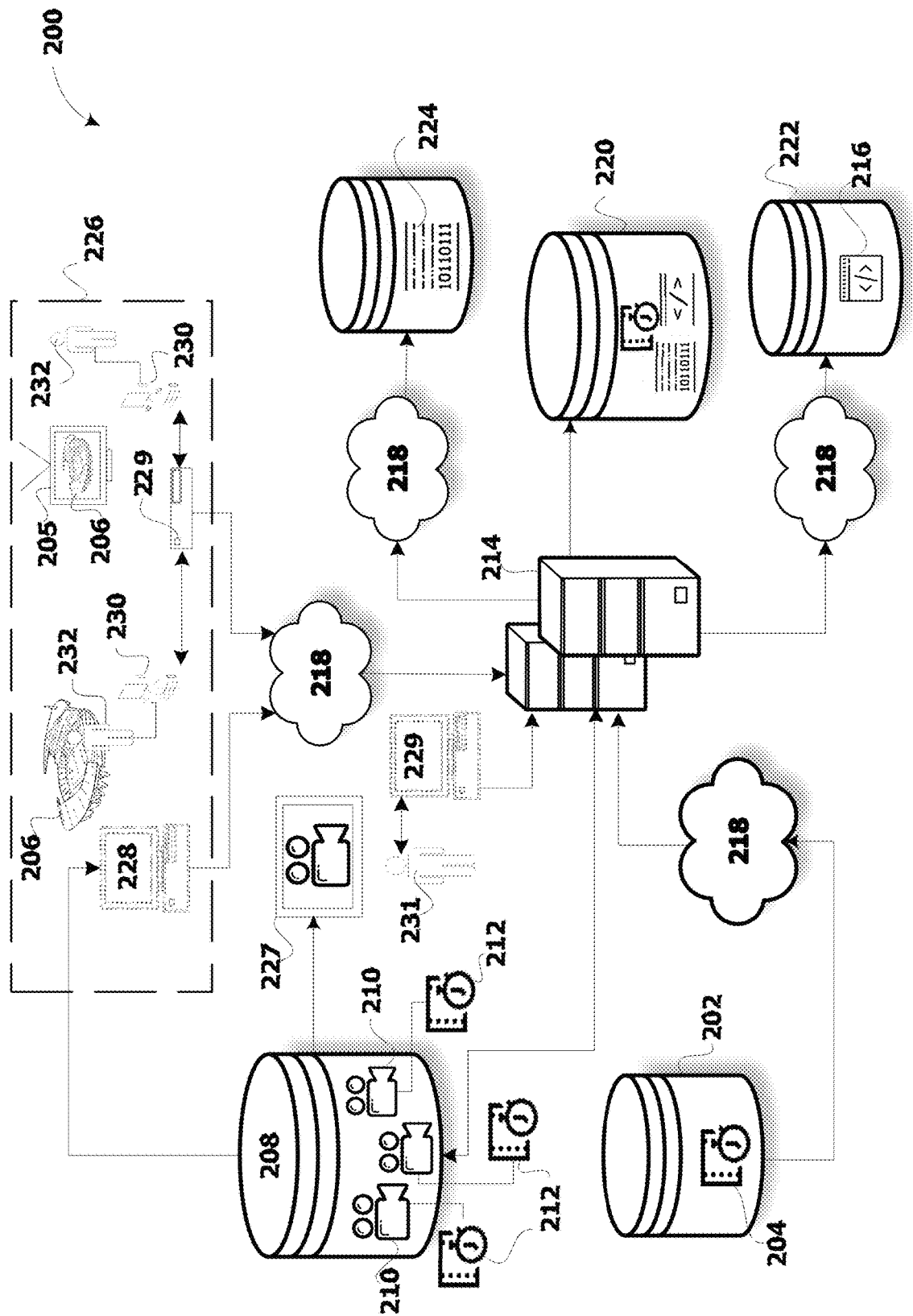
FIG. 5 is schematic block-diagram of a system for collecting and processing progressivistic metadata, according to some preferred embodiments of the present invention.
Figure 6:
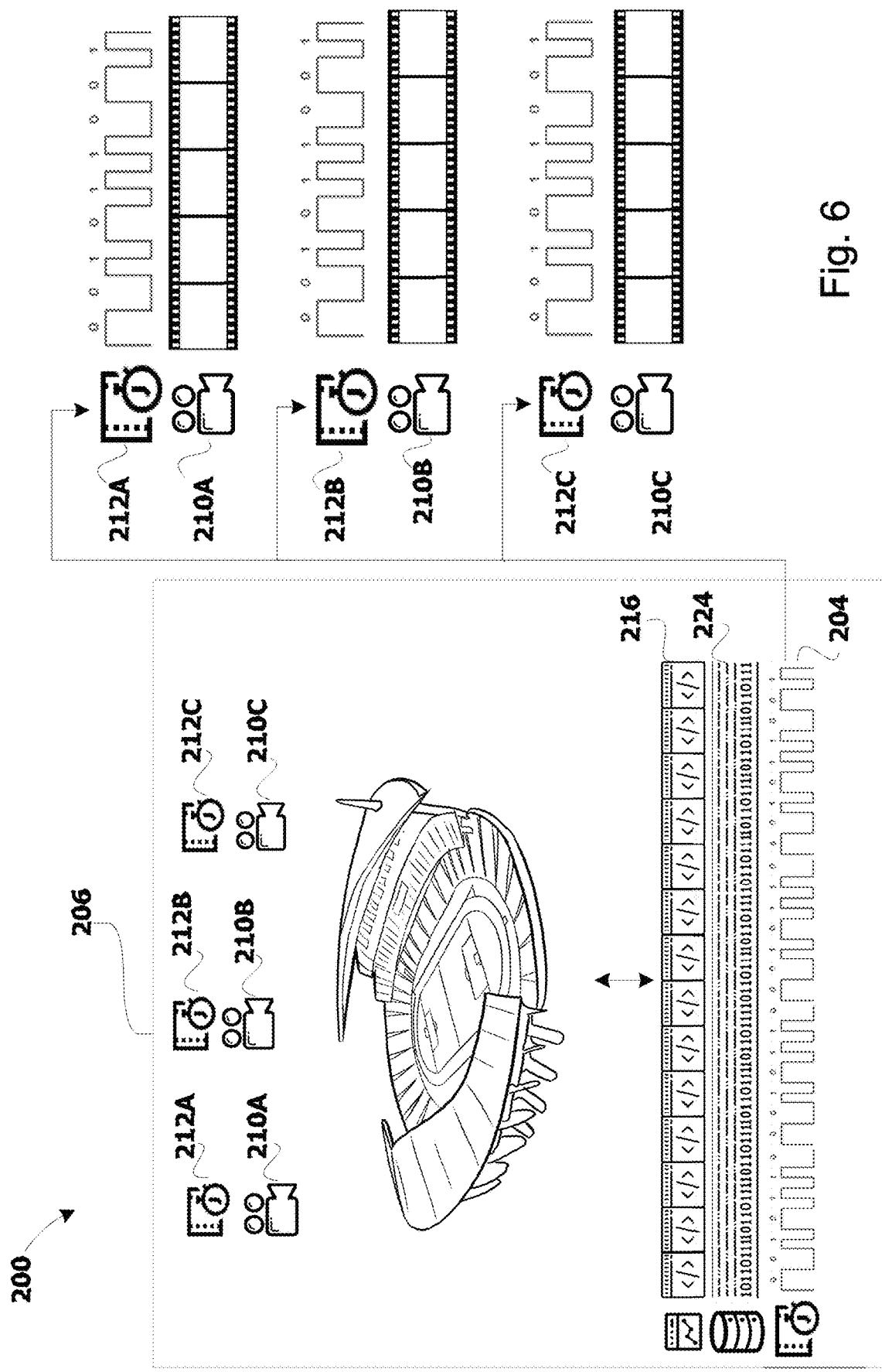
FIG. 6 is a schematic diagram representing the constellation of a real-life event and respective progressivistic metadata file including an absolute timecode, synchronized with relative timecodes or keykodes of video files, according to some preferred embodiments of the present invention.

In accordance with some preferred embodiments of the present invention, reference is now made to FIGS. 5 and 6, showing respectively system 200 for collecting and processing progressivistic metadata and the constellation of a real-life event and respective progressivistic metadata file including an absolute timecode, synchronized with relative timecodes or keykodes of video files. In some embodiments, system 200 shown in FIG. 5 comprises absolute timecode database 202. Absolute timecode database 202 is configured for storing absolute timecode file 204, uniquely identifying particular time-frames in a real-life event or distinct time-segments in real-life event 206 shown in FIG. 6.

In some preferred embodiments, system 200 further comprises accessible video files database 208. Accessible video files database 208 is configured for storing at least one source video file 210. Video file 210 further comprises and/or associated with and/or synchronized with relative timecode file 212. In some examples, video files database 208 stores video files 210A, 210B and 210C, shown in FIG. 6, in which each one of video files 210A, 210B and 210C comprising a recording of the occurrence of real-life event 206. Video files 210A, 210B and 210C respectively comprise and/or associated with and/or synchronized with relative timecode files 212A, 212B and 212C.

In some embodiments, the particular time-frames and/or the distinct time-segments in the occurrence of real-life event 206 encoded in absolute timecode file 204 stored in timecode database 202 are respectively related to the particular time-frames and/or distinct time-segments in relative timecode file 212 of at least one source video file 210 stored in video files database 208. In some embodiments, the timecode of relative timecode file 212 of at least one source video file 210 in video files database 208 is the timecode of absolute timecode file 204 in timecode database 202. In other embodiments, the timecode of relative timecode file 212 of at least one source video file 210 in video files database 208 is synchronizable or linkable to the timecode of absolute timecode file 204 in timecode database 202.

In some embodiments, system 200 further comprises server 214. Server 214 is configured for generating progressivistic metadata file 216, in which events encoded into progressivistic metadata file 216 are respectively related to the particular time-frames and/or distinct time-segments in absolute timecode file 204, stored in absolute timecode file database 202. Absolute timecode file 204 in timecode database 202 is optionally transferable via computer network 218 to server 214 for processing progressivistic metadata and stored in database 220 alongside progressivistic metadata file 216.

In some embodiments, the events encoded into progressivistic metadata file 216 comprise a predefined progressivistic parameter related to a particular player and/or particular gamer and/or particular performer and/or particular team member and/or particular pair of team members and/or particular group of team members. In some embodiments, system 200 further comprises progressivistic metadata database 222. Progressivistic metadata database 222 is configured for storing progressivistic metadata file 216.

In some embodiments, system 200 further includes device 227 configured for performing controllable of at least one source video file 210 displaying a playback of a historical real-life event recorded on at least one source video file 210 in database 208 and/or a playback of real-life event 206 in a real-time or near real time regime. In some embodiments, system 200 further includes at least one human-machine interface on computational device 229 configured for encoding progressivistic metadata events into the progressivistic metadata file by human operator 231.

In some embodiments, system 200 further includes a performance data module. In some instances, the performance data module is configured for collecting and processing performance data, in which events logged into performance data file 224 are related to events encoded into progressivistic metadata file 216, whereas in other instances, the performance data, in which events logged into performance data file 224 are unrelated to events encoded into progressivistic metadata file 216.

In some embodiments, system 200 further includes at least one progressivistic metadata interface 226. At least one progressivistic metadata interface 226 is configured for encoding events into progressivistic metadata file 216.

In some embodiments, at least one progressivistic metadata interface 226 is a computer terminal comprising a human-machine interface, configured for manually logging events into progressivistic metadata file 216 and/or an interface configured for logging relations between the events encoded into progressivistic metadata file 216 and the events encoded into performance data file 224 and/or an interface configured for specifying an associative metric. In some preferred embodiments, the encoding events into progressivistic metadata file 216 are performed by a human operator in a real-time regime or near real-time regime.

In some embodiments, system 200 further comprises at least one automated progressivistic metadata logging module, comprising a reinforced machine learning device 228, configured for analyzing at least one source video file 210 and identifying progressivistic metadata events by analyzing at least one source video file 210 in automated manner and then for encoding automatically identified progressivistic metadata events into progressivistic metadata file 216.

Reinforced machine learning device 228 typically implements an artificial intelligence algorithm. In some examples, the artificial intelligence algorithm is trained on the correlation between and/or classification of events in the training dataset of historical source video files and events in the training dataset of historical progressivistic metadata files. Historical progressivistic metadata files typically logged by individual professional operators, facilitate the artificial intelligence algorithm to analyze historical source video files datasets, for instance of basketball matches, and learn the intelligence algorithm to correlate and/or classify correctly progressivistic metadata events in historical progressivistic metadata files, resulting with a trained computational model that is built from a training. The trained computational model is then implemented by reinforced machine learning device 228 for analyzing at least one source video file 210 and identifying progressivistic metadata events in at least one source video file 210 in automated manner.

In some embodiments, system 200 further comprises at least one automated progressivistic metadata logging module. At least one automated progressivistic metadata logging module comprises a plurality of portable computing devices 230 comprising a human-machine interface. Portable computing devices 230 are configured for manually logging, by plurality watchers 232 of real-life event 206 at the stadium and/or remotely on television device 205 in a real-time regime, preliminary progressivistic draft events, thereby collecting and generating preliminary progressivistic draft data.

In some embodiments, at least one automated progressivistic metadata logging module 229 further comprises a reinforced machine learning device. Reinforced machine learning device 229 is configured for analyzing the preliminary progressivistic draft data, collected from a plurality of portable computing devices 230 of a crowd of watchers 232 and identifying selected preliminary progressivistic draft events in the preliminary progressivistic draft data that attain a predetermined quality threshold, as quality assured progressivistic metadata events. In some embodiments, at least one automated progressivistic metadata logging module 229 is further configured for encoding the quality assured progressivistic events into said progressivistic metadata file 216, in an automated manner.

Reinforced machine learning device 229 typically implements an artificial intelligence algorithm. In some examples, the artificial intelligence algorithm of device 229 is trained on the correlation between and/or classification of events in the training dataset of historical progressivistic metadata files and the preliminary progressivistic draft data. Historical progressivistic metadata files typically logged by individual professional operators, facilitate the artificial intelligence algorithm of device 229 to analyze the preliminary progressivistic draft datasets, for instance logged by the crowd of watchers of basketball matches, whether at the stadium or remotely, and learn the intelligence algorithm to correlate and/or classify correctly progressivistic metadata events in historical progressivistic metadata files, resulting with a trained computational model. The trained computational model of device 229 is then implemented by the reinforced machine learning device for analyzing at least one the preliminary progressivistic draft data file and identifying the quality assured progressivistic events in the preliminary progressivistic draft data in automated manner. The at least one automated progressivistic metadata logging module 229 is typically further configured for encoding then the quality assured progressivistic events into said progressivistic metadata file 216, in an automated manner.

In some embodiments, at least one source video file 210, relative timecode file 212, absolute timecode file 204, progressivistic metadata file 216 and performance data file 224 in a non-limiting manner are compiled into a singular file. In other embodiments, at least one source video file 210, relative timecode file 212, absolute timecode file 204, progressivistic metadata file 216 and performance data file 224 are synchronizable and/or linkable in-between.

Figure 7:
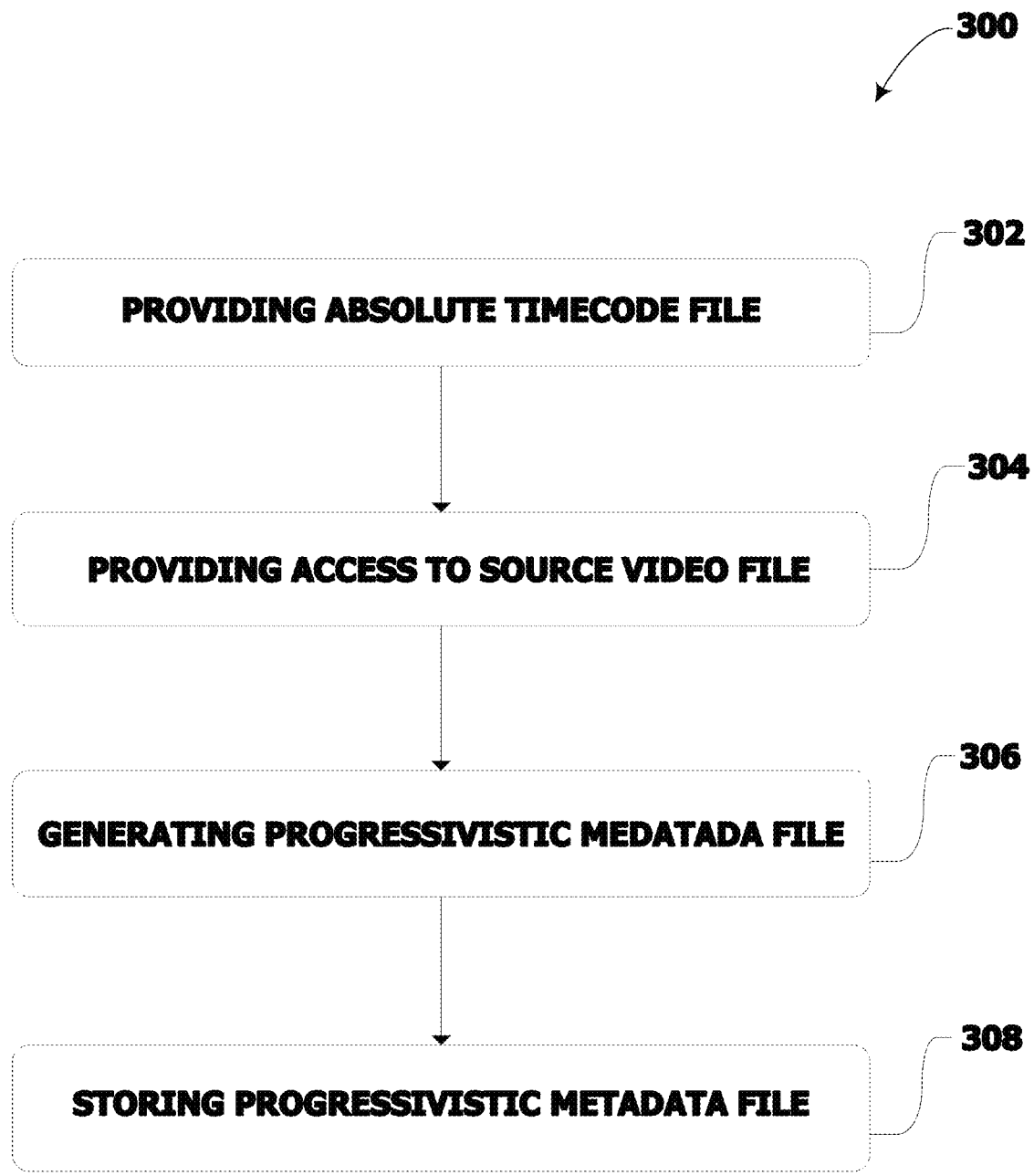
FIG. 7 is a computational level flowchart of a method for collecting and processing progressivistic metadata, according to some preferred embodiments of the present invention.

In accordance with some embodiments of the present invention, reference is now made to FIG. 7, showing a computational level flowchart of method 300 for collecting and processing progressivistic metadata. Method 300 commences with step 302 of providing an absolute timecode file or access thereto, uniquely identifying particular time-frames and/or distinct time-segments in the real-life event.

In some embodiments, method 300 further comprises step 304 of providing access to a source video file, in which the source video file comprising a recording of the real-life event, in which the source video file further comprises at least a relative timecode file. The particular time-frames and/or distinct time-segments of the real-life event in the absolute timecode file, stored in the timecode database, are respectively related to particular frames and/or distinct segments in the relative timecode file of at least one source video file stored in the video files database.

In some embodiments, method 300 further comprises step 306 of generating a progressivistic metadata file, in which events encoded into the progressivistic metadata file are respectively related to the particular time-frames and/or distinct time-segments in the absolute timecode file, stored in the absolute timecode file database. In some embodiments, step 306 is achievable by manually logging from a human-machine interface of a plurality of portable computing devices of a crowd of watchers of the real-life event, in a real-time regime, preliminary progressivistic draft events.

In some embodiments, step 306 further comprises a step of analyzing the preliminary progressivistic draft data by a reinforced machine learning device and identifying selected preliminary progressivistic draft events in the preliminary progressivistic draft data that attain a predetermined quality threshold, as quality assured progressivistic events. In some embodiments, step 306 further comprises a step of encoding the quality assured progressivistic events into the progressivistic metadata file, in an automated manner. In some embodiments, method 300 further includes step 308 of storing the progressivistic metadata file in a progressivistic metadata database.

In some embodiments, method 300 further comprises a step of providing a performance data module, configured for collecting and processing performance data, in which events logged into a performance data file are related to events encoded into the progressivistic metadata file. In some embodiments, method 300 further comprises a step of providing a controllable playback of the source video file on a playback device and encoding events into the progressivistic metadata file is performed by a human operator in a real-time or near real time regime.

In some embodiments, method 300 further includes step of analyzing at least one source video file and identifying progressivistic metadata events in at least one source video file in automated manner and encoding identified progressivistic metadata events into the progressivistic metadata file, by at least one automated progressivistic metadata logging module, comprising a reinforced machine learning device. In some embodiments, method 300 further includes step of compiling into a singular file: at least one source video file, a relative timecode file, an absolute timecode file, a progressivistic metadata file and a performance data file.

Figure 8:
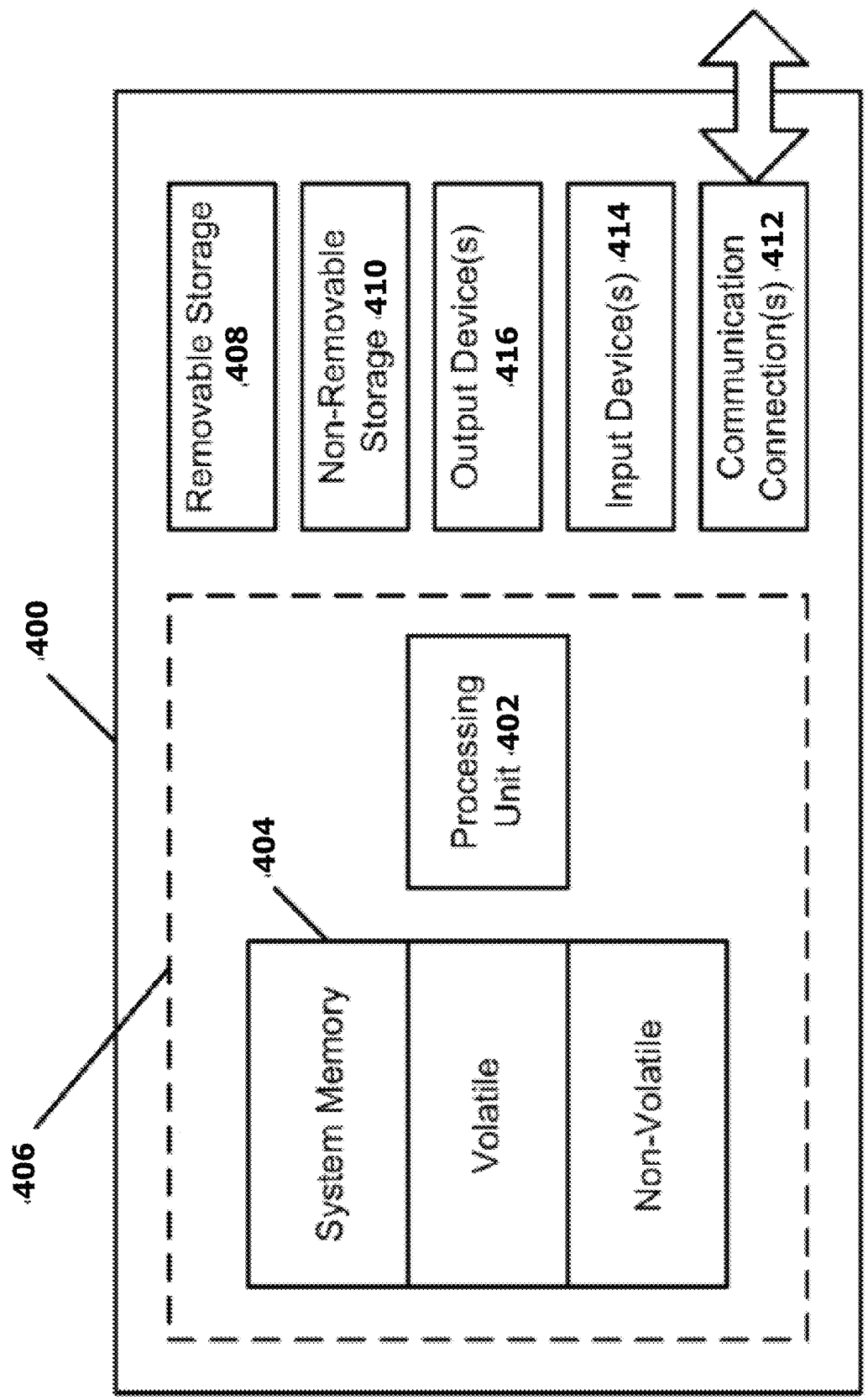
FIG. 8 is a schematic diagram of an exemplary computing environment.

With reference to FIG. 8, an exemplary system for implementing aspects described herein includes a computing device, such as computing device 400. In its most basic configuration, computing device 400 typically includes at least one processing unit 402 and memory 404. Depending on the exact configuration and type of computing device, memory 404 may be volatile (such as random-access memory RAM), non-volatile (such as read-only memory ROM, flash memory, etc.), or some combination of the two. This most basic configuration is illustrated in FIG. 8 by dashed line 406.

Computing device 400 may have additional features/functionality. For example, computing device 400 may include additional storage (removable and/or non-removable) including, but not limited to, magnetic or optical disks or tape. Such additional storage is illustrated in FIG. 8 by removable storage 408 and non-removable storage 410.

Computing device 400 typically includes a variety of computer readable media. Computer readable media can be any available media that can be accessed by computing device 400 and include both volatile and non-volatile media, and removable and non-removable media. Computer storage media include volatile and non-volatile, and removable and non-removable media implemented in any method or technology for storage of information such as computer readable instructions, data structures, program modules or other data. Memory 404, removable storage 408, and non-removable storage 410 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of computing device 400.

Computing device 400 may contain communications connection(s) 412 that allow the device to communicate with other devices. Computing device 400 may also have input device(s) 414 such as a keyboard, mouse, pen, voice input device, touch input device, etc. Output device(s) 416 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include PCs, network servers, and handheld devices, for example.

It will be appreciated by persons skilled in the art that the present invention is not limited by what has been particularly shown and described herein above. Rather the scope of the invention is defined by the claims which follow:

The invention claimed is:

1. A system for collecting and processing progressivistic metadata comprises:
   a) a timecode database, configured for storing an absolute timecode file, uniquely identifying at least one member selected from the group consisting of: particular time-frames in a real-life event and distinct time-segments in said real-life event;
   b) an accessible video files database, configured for storing at least one source video file, wherein said video file comprising a recording of said real-life event, wherein said video file further comprises a relative timecode file;

wherein said particular time-frames and/or distinct time-segments in said real-life event in said absolute timecode file in said timecode database are respectively related to particular frames and/or distinct segments in said relative timecode file of said at least one source video file in said video files database;

c) a server configured for generating a progressivistic metadata file, wherein events encoded into said progressivistic metadata file are respectively related to said particular time-frames and/or distinct time-segments in said absolute timecode file, in said absolute timecode file database;

d) a progressivistic metadata database, configured for storing said progressivistic metadata file.

2. The system for collecting and processing progressivistic metadata, as in claim 1, further comprises a performance data module, configured for collecting and processing performance data, wherein events logged into a performance data file are related to events encoded into said progressivistic metadata file.

3. The system for collecting and processing progressivistic metadata, as in claim 1, further comprises at least one progressivistic metadata interface, configured for encoding events into said progressivistic metadata file.

4. The system for collecting and processing progressivistic metadata, as in claim 1, further comprises at least one progressivistic metadata logging interface, configured for encoding events into said progressivistic metadata file, selected from the group consisting of:

a) a computer terminal comprising a human-machine interface, configured for manually logging events into said progressivistic metadata file, by a human operator;

b) an interface configured for logging relations between said events encoded into said progressivistic metadata file and said events encoded into said performance data file;

c) an interface configured for specifying an associative metric.

5. The system for collecting and processing progressivistic metadata, as in claim 1, further comprises a controllable playback device, wherein encoding events into said progressivistic metadata file is performed by a human operator in a real-time regime or near real-time regime.

6. The system for collecting and processing progressivistic metadata, as in claim 1, further comprises at least one automated progressivistic metadata logging module, comprising a reinforced machine learning device, configured for analyzing said at least one source video file and identifying progressivistic metadata events in said at least one source video file in automated manner and for encoding identified progressivistic metadata events into said progressivistic metadata file.

7. The system for collecting and processing progressivistic metadata, as in claim 1, further comprises at least one automated progressivistic metadata quality assurance module, comprises:

a) a plurality of portable computing devices comprising a human-machine interface, configured for manually logging, by a plurality of watchers of said real-life event, in a real-time regime, preliminary progressivistic draft events, thereby collecting and generating preliminary progressivistic draft data;

b) a reinforced machine learning device, configured for analyzing said preliminary progressivistic draft data and identifying selected preliminary progressivistic draft events in said preliminary progressivistic draft data that attain a predetermined quality threshold, as quality assured progressivistic events;

c) at least one automated progressivistic metadata logging module configured for encoding said quality assured progressivistic events into said progressivistic metadata file, in an automated manner.

8. The system for collecting and processing progressivistic metadata, as in claim 1, wherein at least one file selected from the group consisting of: said at least one source video file, said relative timecode file, said absolute timecode file, said progressivistic metadata file and a performance data file, are compiled into a singular file.

9. The system for collecting and processing progressivistic metadata, as in claim 1, wherein a timecode of said relative timecode file of said at least one source video file in said video files database is a timecode of said absolute timecode file in said timecode database or wherein said timecode of said relative timecode file of said at least one source video file in said video files database is synchronizable or linkable to said timecode of said absolute timecode file in said timecode database.

10. The system for collecting and processing progressivistic metadata, as in claim 1, wherein said events encoded into said progressivistic metadata file comprise a predefined progressivistic parameter related to at least one member selected from the group consisting of: a particular player, particular gamer, particular performer, particular team member, particular pair of team members, particular group of team members.

11. A method of collecting and processing progressivistic metadata comprises the steps of:

a) providing an absolute timecode file, uniquely identifying at least one member selected from the group consisting of: particular time-frames in a real-life event and distinct time-segments in said real-life event;

b) providing access to a source video file, wherein said source video file comprising a recording of said real-life event, wherein said source video file further comprises a relative timecode file;

wherein said particular time-frames and/or distinct time-segments of said real-life event in said absolute timecode file, stored in said timecode database, are respectively related to particular frames and/or distinct segments in said relative timecode file of said at least one source video file in said video files database;

c) generating a progressivistic metadata file, wherein events encoded into said progressivistic metadata file are respectively related to said particular time-frames and/or distinct time-segments in said absolute timecode file, in said absolute timecode file database;

d) storing said progressivistic metadata file in a progressivistic metadata database.

12. The method of collecting and processing progressivistic metadata, as in claim 11, further comprises providing a performance data module, configured for collecting and processing performance data, wherein events logged into a performance data file are related to events encoded into said progressivistic metadata file.

13. The method of collecting and processing progressivistic metadata, as in claim 11, further comprises providing a controllable playback of said source video file and encoding events into said progressivistic metadata file is performed by a human operator in a real-time or near real time regime.

14. The method of collecting and processing progressivistic metadata, as in claim 11, further comprises:

a) manually logging from a human-machine interface of a plurality of portable computing devices of a plurality of watchers of said real-life event, in a real-time regime, preliminary progressivistic draft events, thereby generating preliminary progressivistic draft data;

b) analyzing said preliminary progressivistic draft data by a reinforced machine learning device and identifying selected preliminary progressivistic draft events in said preliminary progressivistic draft data that attain a predetermined quality threshold, as quality assured progressivistic events;

c) encoding said quality assured progressivistic events into said progressivistic metadata file, in an automated manner.

15. The method of collecting and processing progressivistic metadata, as in claim 11, further comprises analyzing said at least one source video file and identifying progressivistic metadata events in said at least one source video file in automated manner and encoding identified progressivistic metadata events into said progressivistic metadata file, by at least one automated progressivistic metadata logging module, comprising a reinforced machine learning device.

16. The method of collecting and processing progressivistic metadata, as in claim 11, further comprises compiling into a singular file at least one file selected from the group consisting of: said at least one source video file, said relative timecode file, said absolute timecode file, said progressivistic metadata file and a performance data file.

17. The method of collecting and processing progressivistic metadata, as in claim 11, wherein a timecode of said relative timecode file of said at least one source video file in said video files database is a timecode of said absolute timecode file in said timecode database or wherein said method further comprises synchronizing or linking said timecode of said relative timecode file of said at least one source video file in said video files database with said timecode of said absolute timecode file in said timecode database.

18. The method of collecting and processing progressivistic metadata, as in claim 11, wherein said events encoded into said progressivistic metadata file comprise a predefined progressivistic parameter related to at least one member selected from the group consisting of: a particular player, particular gamer, particular performer, particular team member, particular pair of team members, particular group of team members.

19. A non-transitory computer-readable storage medium, having computer-executable instructions stored thereon which, when executed by a computer micro-processor, causing said micro-processor collecting and processing progressivistic metadata, said computer-executable instructions comprise:

a) instructions causing said micro-processor obtaining and/or reading and/or generating an absolute timecode file, uniquely identifying at least one member selected from the group consisting of: particular time-frames in a real-life event and distinct time-segments in said real-life event;

b) instructions causing said micro-processor obtaining access to a source video file, wherein said source video file comprising a recording of said real-life event, wherein said source video file further comprises a relative timecode file;

wherein said particular time-frames and/or distinct time-segments of said real-life event in said absolute timecode file, stored in said timecode database, are respectively related to particular frames and/or distinct segments in said relative timecode file of said at least one source video file in said video files database;

c) instructions causing said micro-processor generating a progressivistic metadata file, wherein events encoded into said progressivistic metadata file are respectively related to said particular time-frames and/or distinct time-segments in said absolute timecode file, in said absolute timecode file database;

d) instructions causing said micro-processor storing said progressivistic metadata file in a progressivistic metadata database.

20. The computer-readable storage medium, as in claim 19, further comprises said progressivistic metadata file.

* * * * *